United States Patent [19]

Kuepper et al.

[11] 4,282,097
[45] Aug. 4, 1981

[54] DYNAMIC OIL SURFACE COALESCER

[76] Inventors: Theodore A. Kuepper, 4907 Marlin Way, Oxnard, Calif. 93030; Robert S. Chapler, 680 Evergreen, #4, Port Hueneme, Calif. 93041

[21] Appl. No.: 77,959

[22] Filed: Sep. 24, 1979

[51] Int. Cl.³ ............................................. B01D 25/32
[52] U.S. Cl. .................................... 210/200; 210/243; 210/356; 210/332; 210/409
[58] Field of Search ....................... 210/23 R, 409, 356, 210/433 R, DIG. 5, 315, 317, 243, 200, 209, 332

[56] References Cited

U.S. PATENT DOCUMENTS

| | | | |
|---|---|---|---|
| 339,722 | 4/1886 | Wiles | 210/409 X |
| 3,186,551 | 6/1965 | Dornauf | 210/243 |
| 3,256,988 | 6/1966 | Lanier et al. | 210/DIG. 5 |
| 3,326,382 | 6/1967 | Bozek et al. | 210/356 |
| 3,617,548 | 11/1971 | Willihnganz | 210/23 R |
| 3,830,371 | 8/1974 | Garcia | 210/23 R X |
| 3,853,753 | 12/1974 | Jones | 210/23 R |
| 3,931,019 | 1/1976 | Fowler | 210/DIG. 5 |
| 4,011,158 | 3/1977 | Cook | 210/23 R |
| 4,058,463 | 11/1977 | Bartik | 210/DIG. 5 |

*Primary Examiner*—Frank A. Spear, Jr.
*Attorney, Agent, or Firm*—Richard S. Sciascia; Joseph M. St. Amand; William C. Daubenspeck

[57] ABSTRACT

Apparatus and method for separating and removing oil and particulate solids from a dispersion of oil and particulate solids in water or a water-based liquid. During separation, the dispersion is fed under pressure into the inlet end of a plurality of upright coalescer tubes made of a single-layer of flexible, water-permeable fabric and is prevented from exiting through the outlet end of the tubes. The water passes radially through the fabric walls into a stilling chamber surrounding the coalescer tubes and exits through a clean water outlet while the solid particulates are retained on the inner surface of the fabric. The oil particles coalesce on the inner surface of the tubes, forming a layer of oil which migrates through the fabric's pores due to the pressure differential between the inner and outer tube surfaces and forms an oil layer on the outer surface of the fabric. Buoyant forces cause the oil layer on the outside of the tubes to migrate upward along the outside of the fabric to form an easily removed oil layer on the surface of the water in the stilling chamber. The particulate matter which accumulates on the inner surface of the tubes may be removed by periodically permitting the oily waste water to flush rapidly through the inside of the tubes, dislodging the particles and carrying them away through a waste outlet.

20 Claims, 9 Drawing Figures

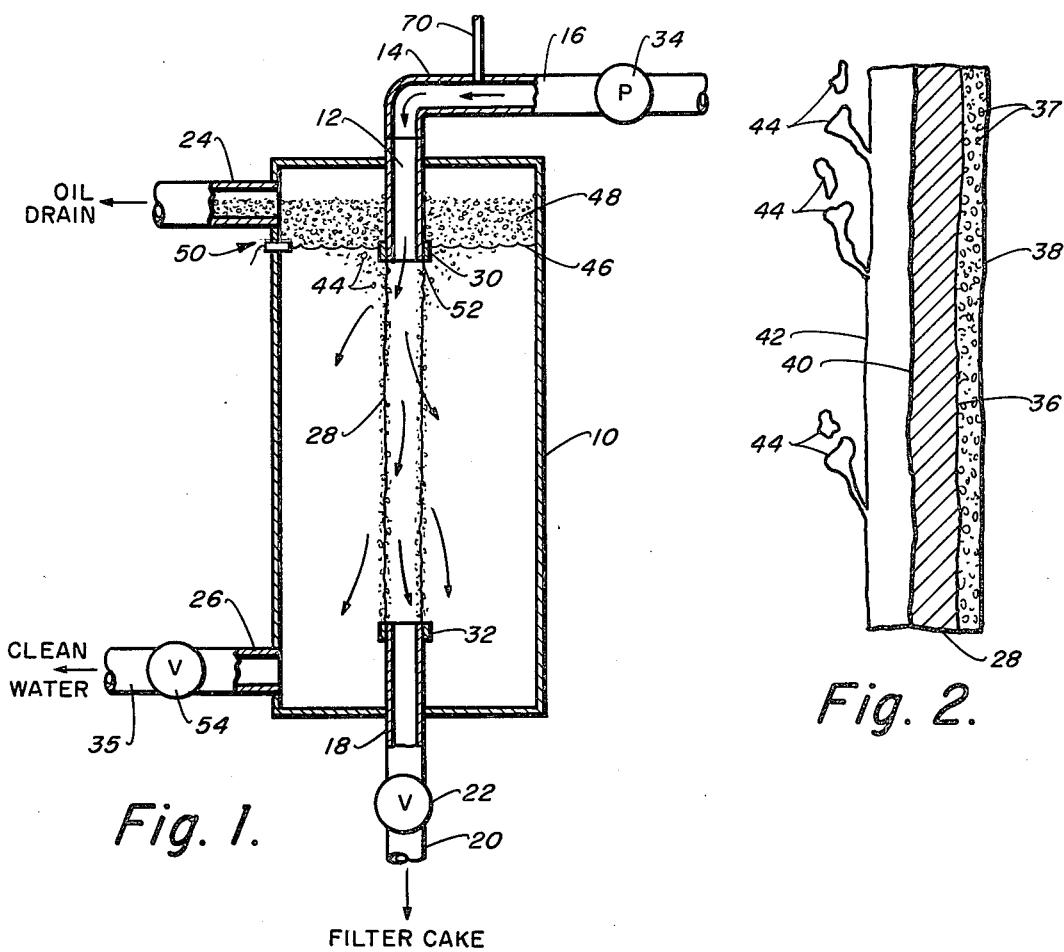
Fig. 1.
Fig. 2.
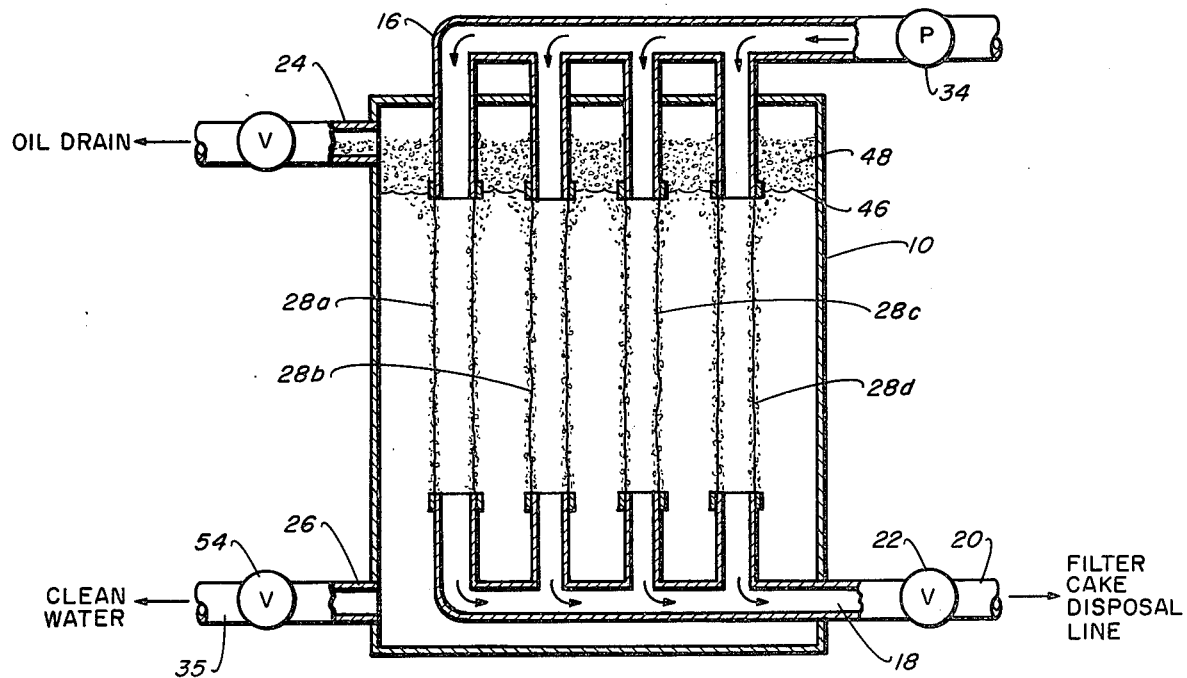
Fig. 3.

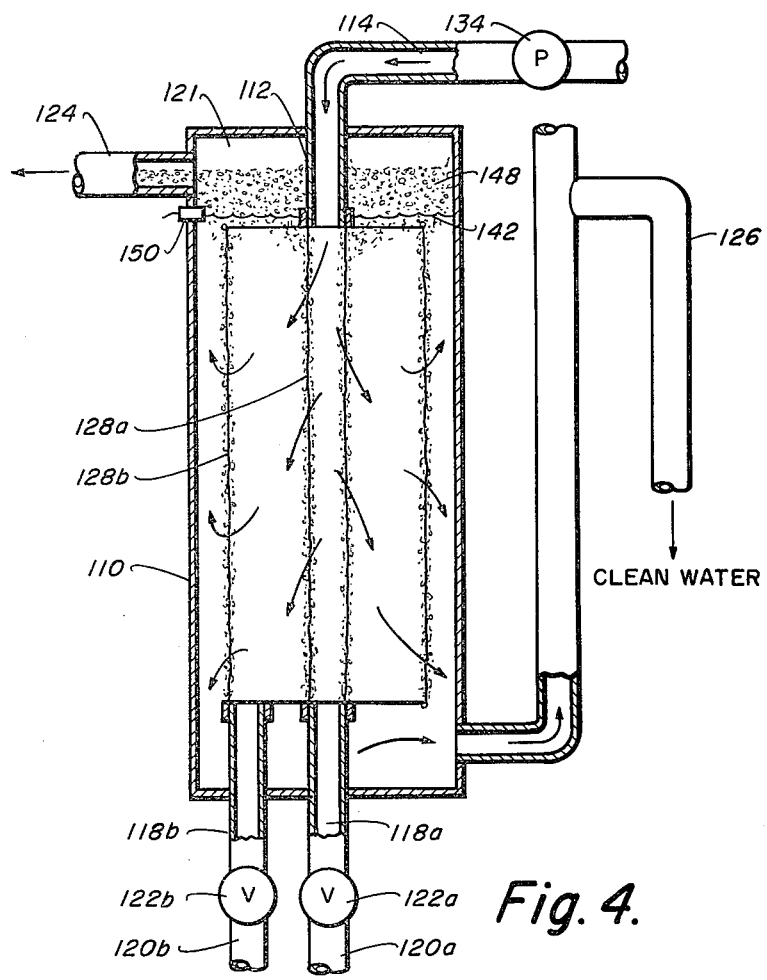
Fig. 4.
Fig. 7.
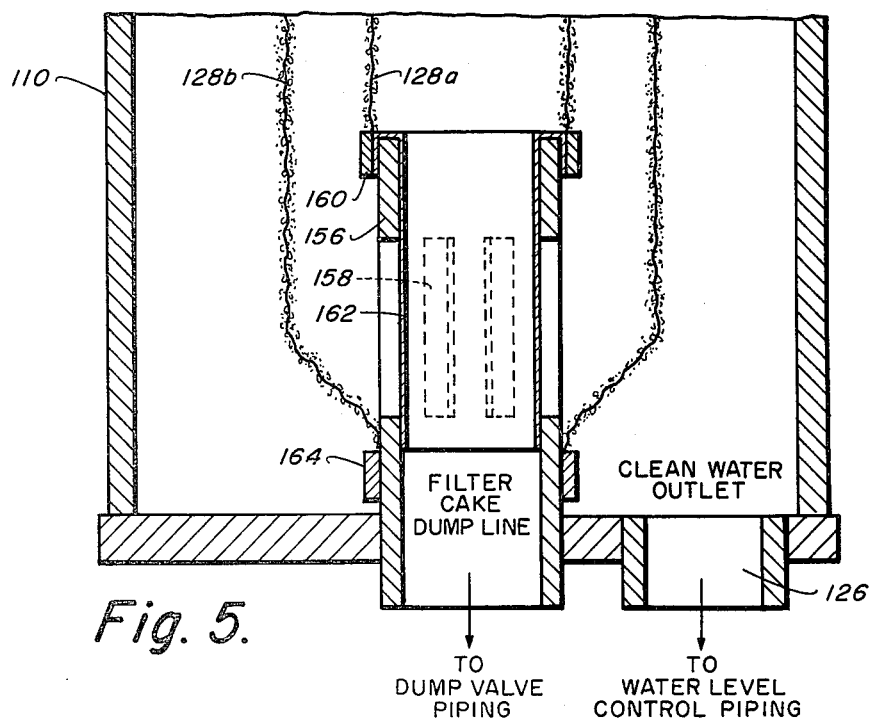
Fig. 5.

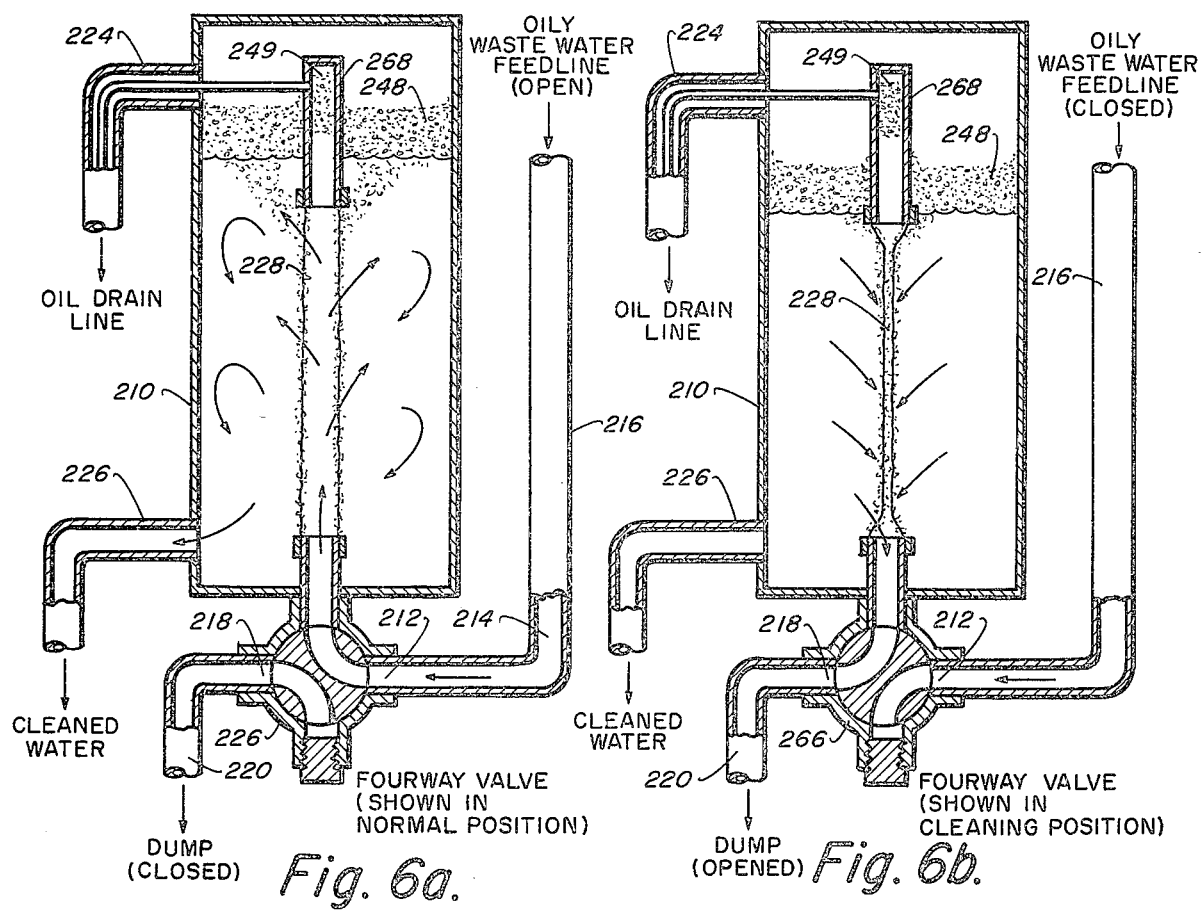
Fig. 6a. Fourway valve (shown in normal position)
Fig. 6b. Fourway valve (shown in cleaning position)
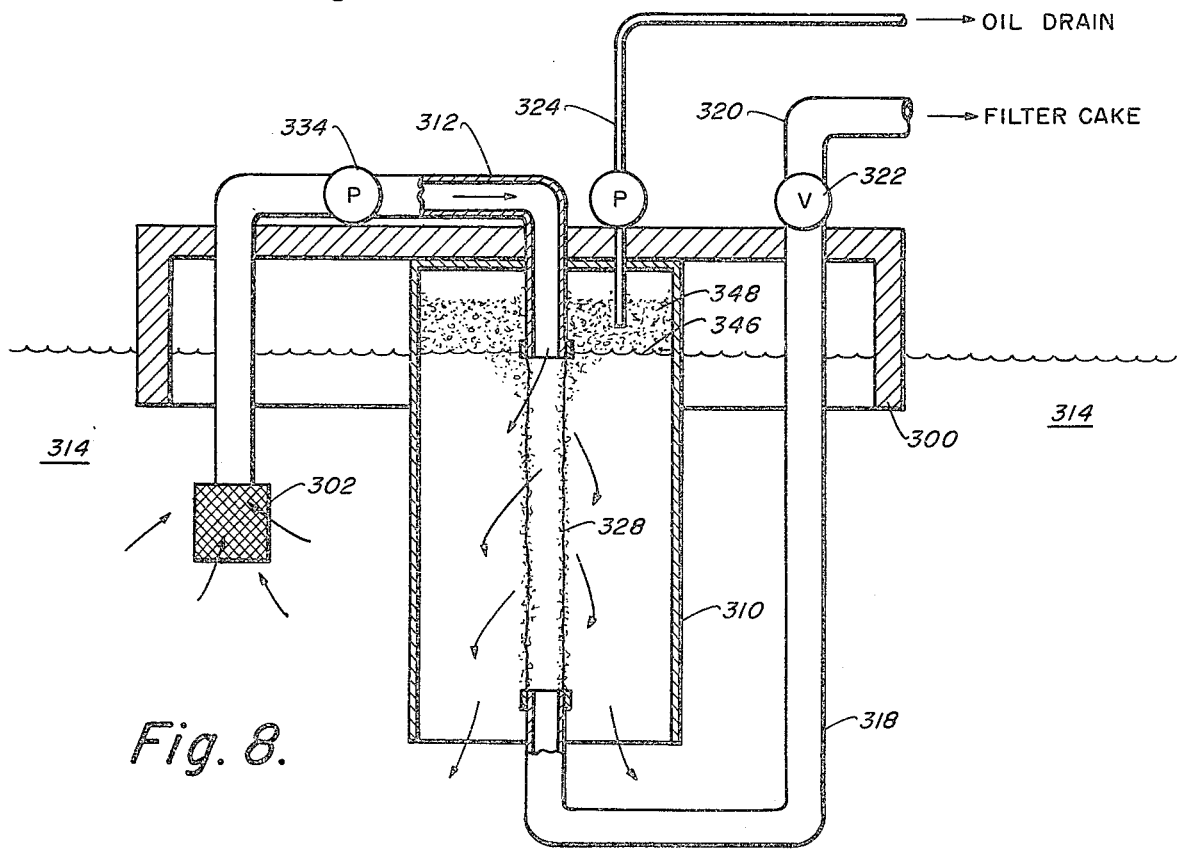
Fig. 8.

DYNAMIC OIL SURFACE COALESCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates in general to the treatment of fluid waste mixtures and, in particular, to apparatus for the separation and removal of oil and particulate solids simultaneously from a dispersion of oil and particulate solids in water.

The Environmental Protection Agency has set specific limits for the concentration of oil in water which can be safely placed into sewer systems without causing harmful effects to publicly owned sewage treatment plants. This concentration is usually 100 mg/l, although when there exists more stringent local restrictions, the more stringent limits take precedence. Local restrictions in harbor areas usually forbid the dumping of oily water in concentrations capable of producing an oil sheen. This oil concentration is approximately 10 mg/l. Therefore, in order to dispose of an oil and water mixture into a sewer system or dump into a harbor, the oil concentration must be reduced to either 100 mg/l or 10 mg/l, respectively.

Existing equipment used for in line removal of oil and suspended particles (dirt) from water typically consists of numerous filter elements and coalescer elements placed in series. The construction of both the filters and the coalescers resembles conventional cloth wound or fabric depth filters, whose dense, fibrous, tortuous path causes separation of the suspended particles in the filter elements, and likewise causes separation of the oil in the coalescer elements.

As an example, the existing method for in line removal of suspended particles (dirt) and oil from the bilge water discharge of a Navy vessel is to first filter the water through a bank of prefilter elements (approximately 10), then coalesce a percentage of the oil in the flow stream through a bank of coalescer elements (approximately 5), and finally coalesce the remaining oil through a second bank of coalescer elements (approximately 5). This flow scheme (prefilter→coalescer→coalescer) is necessary because presently used filters are not designed to remove oil and consequently become plugged prematurely by entrained oil particles. Likewise, coalescers are not designed to remove dirt and become plugged prematurely by entrained dirt particles. Once plugged, neither the filter elements nor the coalescer elements can be cleaned due to their thick, dense construction.

As a result, the filters and coalescers used have an extremely short operating life and must be changed frequently. Typically, filter elements operate for less than one hour before excessive pressure drop forces replacement, while the coalescer elements run somewhat longer before they too must be replaced. For example, while removing the contents of a 25,000 gallon capacity donut, the prefilter bank (10 filters) is changed four times while each of the coalescer banks (five coalescers per bank) is changed twice. At a material cost of $37 per prefilter and per coalescer, the cost of element replacement is $2,220 per 25,000 gallons or about $89 per 1000 gallons of oily water. This cost is greater than the cost of processes which can produce distilled water from a seawater source, long considered a very expensive method of producing water.

SUMMARY OF THE INVENTION

This invention overcomes the foregoing and other disadvantages of the prior art by providing a dynamic oil surface coalescer in which the oily and dirty waste water is passed through a permeable readily cleanable tubular element which provides an excellent coalescing effect even though only one layer of fabric is used. Nearly continuous operation is provided, thus eliminating the requirement for element replacement at short intervals. In addition, the driving pressure required to force oily waste water through the surface coalescer elements is considerably lower than the pressure required in existing systems, further reducing equipment weight, complexity and capital cost.

The oily waste water mixture is fed under pressure into a multiplicity of upright single-layer-fabric coalescer tubes which are disposed in a stilling chamber. The water passes through the fabric walls into the stilling chamber and exits through a clean water outlet while the solid particulates are retained on the inner surface of the fabric. The oil particles coalesce on the inner surface of the tubes, forming a layer of oil which migrates through the fabric's pores due to the pressure differential between the inner and outer tube surfaces and forms an oil layer on the outer surface of the fabric. Buoyant forces cause the oil layer on the outside of the tubes to migrate upward along the outside of the fabric to form an easily removed oil layer on the surface of the water in the stilling chamber. The particulate matter which accumulates on the inner surface of the tubes may be removed by periodically permitting the oily waste water to flush rapidly through the inside of the tubes, dislodging the particles and carrying them away through a waste outlet.

Additional advantages and features will be readily appreciated as the present invention becomes better understood by reference to the following detailed description, when considered in conjunction with the accompanying drawing wherein:

BRIEF DESCRIPTION OF THE DRAWING

FIG. 1 is a schematic representation of one embodiment of the dynamic oil surface coalescer;

FIG. 2 illustrates the operation of the coalescer tube in separating the components of the input waste mixture;

FIG. 3 is a schematic representation illustrating that a plurality of coalescing elements may be arranged in parallel according to the present invention;

FIG. 4 is a schematic representation of a second embodiment illustrating that concentric coalescer elements may be arranged to provide a series of coalescing stage according to the present invention;

FIG. 5 illustrates a variation of the embodiment of FIG. 4 in which a single dump valve is used to back-flush a series arrangement of coalescer elements;

FIGS. 6a and 6b are schematic representations of a third embodiment in which the oily waste water is fed into the bottom of the coalescer element;

FIG. 7 illustrates a support which may be used to prevent collapse of the coalescer element during back-flush operation; and FIG. 8 illustrates the operation of the present invention as a floating system for cleaning an open-top tank.

DESCRIPTION OF THE PREFERRED EMBODIMENT

Referring now to FIG. 1 which illustrates the basic dynamic oil coalescing system, there is shown an upright cylindrical stilling chamber 10 having an oily water inlet 12 at the top thereof for receiving the input waste water mixture 14 (typically including water, oil, and solid particulate matter) from an oily water inlet line 16 and having a waste outlet 18 at the bottom for removing filtered particulates. The waste outlet 18 is coupled to waste output piping 20 in which a dump valve 22 is disposed for controlling the flow of liquid through the waste outlet 18. As will be explained hereinafter, the dump valve 22 is normally maintained in the closed position and is periodically opened to flush filtered particulate matter referred to herein as the filter cake from the system when the pressure in the oily water inlet line reaches a predetermined value.

An oil outlet 24 and a clean water outlet 26 are disposed radially from the stilling chamber 10 near the top and bottom, respectively, for removing the oil and water following operation.

A liquid permeable, fabric, tubular coalescer element (coalescer tube) 28 is coupled between the oily water inlet 12 and the waste outlet 18 by suitable fastening means such as hose clamps 30 and 32, respectively. The tubular, coalescer element 28 is a single, flexible, layer of preferably oleophilic fabric and may be woven or nonwoven from natural or synthetic fibers (such as cotton or polypropylene).

In operation, the input mixture 14 of oil, water, and solid particulate matter is fed from a holding tank or other source (not shown) via inlet line 16 into the oily water inlet 12 at a predetermined flow rate under pressure (typically 20 psi normal operating pressure) provided by a suitable pumping means 34. The approximate flow rate is determined by the characteristics of the input mixture 14. In general, the input flow rate is adjusted so that the contaminants (oil and solid particulates) entering the system are maintained at a predetermined level per unit of time. Thus, a higher concentration of oil particles in the input waste mixture will, in general, require a lower input flow rate than would a lower concentration. The input waste mixture 14 flows downward (the direction of flow is indicated by arrows) into the flexible, permeable coalescer tube 28 which permits water to pass readily outward from within the tube into the stilling chamber 10. The dump valve 22 is maintained in the closed position so that the input waste water mixture 14 cannot exit the coalescer tube 28 through the waste outlet 18. The water therefore passes radially outward from within the tube into the stilling chamber 10 while the particulate matter whose dimensions are greater than the fabric's pores are retained on the inside of the tube. (The retained particulate matter is represented by numeral 37 in FIG. 2.) The water passing through the coalescer tube 28 into the stilling chamber 10 flows downward in the chamber to the clean water outlet 26 and into an outlet piping means 35.

As shown in FIG. 2 which is an enlarged cross-sectional view of a portion of a wall of the fabric coalescer tube illustrating the operation of the coalescer tube in separating the components of the input waste water mixture 14, oil particles also impinge on the inner surface 36 of the coalescer tube 28 wetting the fabric and coalescing into a semi-continuous oil layer 38. This inner oil layer 38 migrates through the fabric's pores under the influence of the pressure difference (due to the operation of pump means 34) between the inner surface 36 and outer surface 40 forming an oil layer 42 adhering to the outer surface. Oil droplets coalescing on the inner surface 36 of the permeable coalescer tube 28 are forced through the tube's pores and continue to grow in size as they contact the oil layer 42 adhering to the outer surface 40.

This outer surface oil layer 42 forms an unstable mass clinging to the coalescer fabric. Thus small oil droplets on the inner surface 36 are forced to travel through an oil layer and in this way produce an excellent coalescing effect far superior to that which one might expect from a one layer fabric coalescer. In effect, the small oil particles grow (coalesce) by being forced through a dynamic membrane (oil layer 42) of oil which adheres to the outside surface 40 of the fabric coalescer tube 28.

The buoyant oil masses (since the specific gravity of the oil is less than that of the liquid (water)) accumulating on the outer surface of the fabric coalescer tube 28 migrate upward when buoyant forces overcome the cohesive and viscous forces holding the oil onto the fabric surface. This upward migration of merging oil particles (identified by numeral 44 in FIGS. 1 and 2) is enhanced greatly by the relatively still volume provided by the stilling chamber 28. The oil droplets 44 continue to merge upon arrival at the surface 46 of the water above the coalescer tube 28, forming a layer 48 of oil resting on the surface of the water.

The collected oil 48 is removed from the top of the stilling chamber 10 via the oil outlet 24. Typically, a transfer pump (not shown) will be intermittently operated under the control of an oil/water interface detector 50 to remove the collected oil when a predetermined amount has been collected.

During the hereinbefore described separation process the water level in the stilling chamber 10 is maintained at a level above the upper end 52 of the coalescer tube 28 so that the coalescing process may occur over the entire length of the fabric coalescer tube. A person skilled in the art will recognize that there are numerous conventional techniques which may provide appropriate input and output flow rates to maintain the water in stilling chamber 10 at the proper level. For example, a flow control valve 54 may be disposed in the outlet piping means 35 to adjust the flow of water through the clean water outlet 26 in response to the flow rate of the oily water input line 16 or to the water level in the stilling chamber 10.

As particulate matter accumulates on the inner surface of the coalescer tube 28, the pressure required to maintain the predetermined input flow rate increases. The pressure increases at a rate dependent on the rate of particulate accumulation on the inner surface 30 until the fabric tube 28 begins to elongate and pumping requirements reach a predetermined maximum.

An important feature of the present invention is that it permits a simple, effective cleaning technique to restore low pressure operation. When the pressure reaches the predetermined maximum because the accumulated particulate matter is impeding the passage of oil and water through the coalescer tube 28, the dump valve 22 is opened permitting the input waste water mixture 14 to flush rapidly through the inside of the tube carrying the accumulated particulate matter (the filter cake) away from the inner surface 36 of the tube wall. A flexing action by the fabric coalescer tube 28 as it tends to return to its original shape when the pumping pressure is lowered by the opening of the dump valve 22 also aids in dislodging the filter cake from the tube walls. In addition, the waste water mixture 14 passing rapidly through the inside of the coalescer tube 28 produces a slight negative pressure which causes water within the stilling chamber to flow through the flexible tube in a backflushing manner thereby increasing the dislodging of the particulate solids. This flushing action causes the filter cake to pass through the waste outlet 18 to a catch basic (not shown) through suitable piping where the particulate matter is concentrated for disposal. For example, a replaceable filter bag may be placed in the waste outlet lines 20 to provide for entrapment of filter cake flushed from the inner surface of the coalescer tube 28. In this way the backwashing liquid may be recycled and conserved while the particulates are concentrated in the replaceable filter bag permitting ready disposal.

It is noted that various methods may be used to increase the efficiency of the backwashing process in cooperation with the basic operation just described. For example, a pulsing flow of the waste water mixture through the coalescer tube 28 may aid in the removal of solid particulates. Various vibration techniques such as vibration bumping may increase the backwashing efficiency or air added to the waste water mixture may aid in the removal process.

Any number of coalescer elements 28 of varying lengths may be arranged in parallel to provide a multiple-tube dynamic oil coalescer as illustrated by FIG. 3 in which four coalescer tubes 28a, 28b, 28c and 28d are arranged in parallel. Each parallel coalescer tube operates in the same manner as the single coalescer tube of FIG. 1. The input waste water mixture 14 is coupled via oily water inlet 12 to the top of each coalescer tube 28a–28d to provide multiple parallel coalescing paths for the mixture. The bottom on each coalescer tube 28a–28d is coupled to the waste outlet 18 for flushing accumulated particulate material. During the tube cleaning phase of operation, the effluents from each of the coalescer tubes 28 are combined in the waste output 18 and directed through a single dump valve 22. The valve 54 placed in the outlet piping means 35 may be closed during the cleaning phase to provide more clean water flow from the stilling chamber 10 back into the coalescer tubes 28 to aid in flushing the accumulated particulates.

It is noted that the particular waste outlet/single dump valve arrangement of FIG. 3 is for purposes of illustration and many other arrangements are suitable as long as sufficient flow is maintained to flush the particulates. For example, the waste outlet 18 may be in the bottom of the stilling chamber 10 as shown in FIG. 1 rather than in the side of the chamber as is shown in FIG. 3. Alternatively, the effluent from each tube 28a–28d may be directed through separate waste outlets controlled by separate dump valves. It will be recognized that various combinations of these arrangements are within the scope of the invention.

Referring to FIG. 4, there is shown a second embodiment of the dynamic oil surface coalescer which uses a series coalescing technique to increase the coalescing effect and thereby produce a clean water effluent of desired quality. A multiplicity of concentric fabric coalescing tubes, represented by tubes 128a and 128b, are disposed in an upright stilling chamber 110 having an oily waste water inlet 112, a clean water outlet 126, and an oil outlet 124. The innermost coalescer tube 128a is coupled between oily waste water inlet 112 and a waste outlet 118a. The outer concentric tube 128b (the next tube in the case of more than two tubes) is disposed around the inner coalescer tube 128a so that a waste water mixture 114 flowing (under pressure from pumping means 134) into the inner coalescing tube must pass through the walls of the inner coalescing tube to enter the annular space between the two tubes. The outer coalescer tube 128b has a waste outlet 118b.

The outer coalescer tube 128b (and successive outer tubes, if present) is disposed by suitable means so that the tubes other than the inner tube 128b communicate with a common oil recovery space 121 formed at the top of the stilling chamber 110.

In operation, the waste water mixture 114 flows through oily waste inlet 112 and downward into the inner coalescing tube 128a which permits water to pass radially outward into the stilling space between the coalescing tubes. The inner coalescing tube 128a separates the oil and the solid particulates in a manner identical to that previously described in connection with FIGS. 1 and 2. The solid particulates with dimensions greater than the fabric's pores are retained on the inner surface of the coalescer tube 128a. The oil is coalesced forming a membrane of oil adhering to the outside surface of the coalescer tube 128a and eventually migrating upward due to buoyant forces to form an oil layer 148 resting on the surface of the water in the annular space between the inner and outer tubes. The waste water passing through the inner coalescer tube 128a thus experiences a first stage of oil coalescing and particulate filtering.

The once cleaned water, after entering the annular chamber between the inner coalescer tube 128a and the outer coalescer tube 128b, flows radially outward through the next coalescer tube 128b and the coalescing and particulate separation processes are repeated so that the water undergoes a second stage of processing. The remaining particulate matter is filtered according to the fabric pore size and an additional coalescing occurs with the coalesced oil migrating to the surface of the water along both the inner and outer walls of the outer tube 128b. Additional concentric coalescing tubes may be employed to provide additional stages of processing to produce a final output of the desired quality. The waste water outlets 118a and 118b have suitable dump valves 122a and 122b for flusing accumulated particulate matter from the coalescer tubes when the pressure required to maintain the appropriate flow rate increases to the predetermined maximum. This tube cleaning process operates in the same manner as described in connection with the previous embodiments.

FIG. 5 shows an embodiment of the dynamic oil surface coalescer employing concentric coalescer tubes and illustrates an arrangement in which a single dump valve may be used to initiate the cleaning process for both the inner and outer coalescer tubes 128a and 128b. The lower end of inner coalescer tube 128a is affixed to the top of a slotted pipe 156 having longitudinally disposed slots 158 by an inner element clamp 160. The inner clamp 160 also secures a thin elastomer sleeve 162 which is disposed longitudinally within the slotted pipe 156 and extends for at least the length of the slotted region. The lower end of the elastomer sleeve 162 is unsecured. The lower end of outer coalescer tube 128b is affixed to the slotted pipe 156 below the slotted region by outer element clamp 164.

The lower end of the slotted pipe 156 extends through the bottom of the stilling chamber 110 and is coupled to suitable piping including a single dump valve (not shown). A clean water outlet 126 is located on the bottom of the stilling chamber 110 outside of the outer coalescer element 128b. The clean water outlet 126 is coupled to the water level control piping (not shown) which permits removal of the filtered water and also maintains the fluid level in the system at the appropriate level for proper operation.

During the coalescing operation (the dump valve is closed), the pressure differential between the inner coalescing tube 28a and the outer tube 128b will expand the flexible elastomer sleeve 162 against the slotted pipe 156 and thereby prevent the fluid in the annular chamber in between the inner and outer coalescing elements from flowing through the slots 158. Thus, the water will be constrained to flow radially through the first tube and then radially through the second tube in the manner previously described.

During the tube cleaning operation (when the dump valve will be open), the pressure differential will be reversed due to the flow of the waste mixture through the inner tube 128a. This pressure differential will cause the elastomer sleeve to flex inward allowing the fluid in the annular chamber and the filter cake accumulated on the inner walls of the outer tube 128b to exit through the slots 158. The filter cake will thus be backflushed from the inside walls of both tubes in the manner which has been previously described in connection with the earlier embodiments.

Referring now to FIGS. 6a and 6b, there is shown an alternate embodiment of the dyanmic oil surface coalescer in which oily waste water 214 is fed into the bottom of the coalescer element 228. This bottom-fed arrangement is useful when relatively light oils are to be separated from the water. FIG. 6a illustrates the system during the separation process. The oily waste water mixture 214 is pumped through four-way valve means 266 upward through the coalescer tube 228 (only a single tube is shown for simplicity). The water passes through the walls of the coalescer tube 228 into the stilling chamber 210 and flows out of the chamber through clean water outlet 212 (as shown by arrows). The fabric coalescer tube 228 operates to separate the oil in the manner previously described. Because the flow of the oily waste water mixture is directed upward, a portion of the oil which coalesces on the inside wall of the fabric coalescer tube 228 migrates to the surface of the water along the inside of the tube. Thus, an oil layer 249 is formed on the water's surface within the tube in addition to the oil layer 248 formed on the water's surface in the stilling chamber resulting from the passage of oil through the coalescer tube wall. An extension 268 on the tube allows oil accumulated inside to the coalescer to be extracted via oil drain line 224.

During backwashing (i.e., after the accumulated particulate matter reaches a level which impedes the flow through the system a predetermined amount), the four-way valve means 266 is switched to the position shown in FIG. 6b. This closes the oily waste water inlet 212 and couples the bottom of the coalescer tube to the waste output piping 220. The liquid (water and oil layer) in the stilling chamber and the waste liquid in the tube will tend to flow down through the tube and exit the system via the waste outlet 218 carrying away the filtered particulates.

The downward flow and the pressure of the water outside the tube will tend to collapse the flexible tube as shown in FIG. 6b which will aid in dislodging the accumulated particles. It is noted that care must be taken in order that any separated oil 249 on the surface of the clean water is not discharged through the clean water outlet as may occur if the stilling chamber 210 is emptied in the cleaning process.

Since the coalescer tubes may tend to collapse during the backwashing operation in all of the foregoing embodiments, particularly in the bottom-fed arrangement, a cage-like support 56 such as illustrated in FIG. 7 may be used to prevent collapse of the fabric tube during backwash. The cage-like support 56 is disposed within the coalescer and having a somewhat smaller diameter than the tube, provides support for the tube while not appreciably impeding the flow of liquids and particulate matter during the separation and backwashing processes.

FIG. 8 shows the dynamic surface oil coalescer as a floating system which can be placed in an open tank to remove dirt and oil from the tank contents. The system is mounted on a platform 300 floating on the surface of the oily waste water 314 contained in a tank (the walls of the tank are not shown). The contents of the tank are pumped through a particulate strainer 302 by a waste water feed pumping means 334 and fed downward into a coalescer tube 328 which is disposed in a open-bottomed stilling chamber 310. The upright stilling chamber 310 and the coalescer tube 328 extend into the contents 314 of the tank so that the coalescer tube is surrounded by the contents of the tank within the stilling chamber 310. The bottom of the coalescer tube 328 is coupled to a filter cake disposal line 318 controlled by a dump valve 322.

During separation of the oil and particulates the dump valve is closed so that the water of the waste water mixture 314 flows radially outward through the walls of the tube into the chamber 310. The solid particulates are filtered by the fabric and the oil coalescer as previously described and migrates to the surface of the water within the stilling chamber 310 where it is removed via oil disposal line 324 and oil disposal pump 325. When the particulates accumulate on the inside of the coalescer tube to a sufficient extent, the dump valve 322 may be opened, providing a backflushing operation similar to that described previously to remove the filter cake from the tube.

In this embodiment (FIG. 8), the clean water is fed back into the tank contents and the separating/backflushing cycle is continued until the contents of the tank have the desired characteristics.

The coalescing effectiveness may be enhanced by providing a means for electrically grounding the coalescer elements. Small oil particles (smaller than $1\mu$ in diameter) may have electrical charges that inhibit coalescing through their repelling forces since electrostatic forces are significant for these very small particles. Grounding the coalescer elements can enhance coalescing action by neutralizing these repelling charges to permit collision of the small particles to occur more readily.

Various structures are suitable for forming the required electrically conductive coalescer elements as the following examples indicate. The coalescer element may be woven from a metallic thread or metallic threads may be interwoven in a synthetic or natural fiber fabric. The coalescer element may be formed of a fabric of synthetic or natural fiber combined with an outer layer of fine metallic screen or mesh, or metallic film may be vacuum deposited on a fabric (woven or non-woven) of natural or synthetic fiber. Because the coalescer element must be flexible to enhance cleanability, the wire involved in the fabrication of the element should be of very fine guage. The thread should also have a very high resistance to corrosion to reduce failure by breakage when corrosion leads to loss of metal. The flexibility and corrosion resistance should be coupled with high fatigue resistance due to many expected flextures during the life of the element and with high electrical conductivity to provide ready dissipation of electrical charges impinging upon it.

Grounding the electrically conductive element can be accomplished through the use of electrically conductive material throughout the apparatus and its piping, providing that a continuous electrical path is formed from the coalescer element to the source of the oily waste water and ground. Further, in piping systems of non-conductive material such as polyvinyl chloride, an electrically continuous connection between coalescer element and earth or ground may be provided by a conductor connected from the coalescer to a ground rod or collector grid placed in the oily waste water reservoir.

It is appropriate to note at this point a few of the applications in which the dynamic oil surface coalescer of the present invention may be used. For example, the present invention can be used on board ships to clean oily water or bilge water to permit discharge into harbors or open sea without violating environmental regulations. The operation of the system is relatively immune to the effects of the ship's rolling movement due to the effects of the stilling chamber; however, baffles present in the stilling chamber will enhance shipboard operation. It is noted that multiple coalescing tubes themselves act as baffles in the stilling chamber.

The present invention can be used in open water oil-spill cleanup in a relatively simple manner. A scooping suction mechanism is attached or tethered to a boat and transported through the oil-spill area. Large quantities of the water and oil mixture will be pumped on board the ship via hose or pipe, and fed to a multiplicity of coalescer units to separate the oil from the water and permit direct discharge of the clean water overboard. Repeated runs through the oil-spill area by the boat will continuously dilute the quantity of oil in the spill area. This operation is relatively immune to the movement of the ocean waves due to the fact that large quantities of water scooped up with the layer of oil during rough sea operation do not inhibit the coalescing process. It is not necessary to skim the oil off the surface of the water, as is required in other oil-spill recovery schemes. During periods of moderate to severe wave action, large quantities of water will be processed with relatively little oil; however, the flow rate through the system can be increased to accommodate the low concentration of oil.

The present invention may also serve as a dispersed air flotation cell or can be used in the treatment of sewage. Flow dispersion within the dynamic oil surface coalescer is a gentle, laminar flow in a horizontal direction outward throughout the entire length of the cloth tube. This dispersion characteristic lends itself to introducing fine bubbles of air into a body of water within which the coalescer assembly is placed. A conventional venturi type of coupling can typically introduce large amounts of air into a water stream but not in a fine bubble dispersion. However, a venturi placed ahead of the coalescer assembly (for example, directed into the oily water input line 16 prior to the coalescer tube 28 as indicated at 70 in FIG. 1) can routinely attain 40 μm diameter dispersed air bubbles as the air and the influent water pass through the walls of the coalescer tube. If the influent water travels through the coalescer along with the dispersed air, filtration as well as dispersed air flotation occurs in one step, within one tank. Air can also be introduced via conventional air dispersion methods (such as air stones) at the bottom of the stilling chamber. Again, filtration as well as dispersed air flotation occurs in one step, within one tank.

Since the present invention facilitates introducing air into a water tank, this apparatus can be used in the treatment of sewage. If the influent sewage is introduced into the dynamic surface oil coalescing system along with dispersed air, filtration as well as excellent aeration occurs in one step, within one tank. The bacteria are concentrated in the walls of the fabric tube and receive sufficient oxygen to provide efficient operation. Sludge is conveniently entrained within the fabric tube and can be withdrawn periodically by fackflushing the system, thus accomplishing a tube cleaning function at the same time.

It is noted that adding coagulating or flocculating chemicals, polyelectrolytes, emulsion breakers, and the like to the input waste mixture will enhance coalescing and consequently increase the separation of the oil particles. The surface coalescer can be used by itself, with or without chemical addition, or in series with a bank of conventional in depth coalescer elements for more complete removal of oil. The present invention can be used to recover oil from stable or unstable emulsions with and without the aid of chemical additives.

It will be recognized that the present invention can be operated under atmospheric pressure conditions (i.e., with an open topped stilling chamber) or can be enclosed in a pressure vessel and made to operate under any pressurized flow/stilling chamber conditions.

An experimental dynamic oil surface coalescer has been constructed employing concentric coalescer tubes in an arrangement similar to that shown in FIG. 4. Inner coalescer tubes (128a) ranging from ⅜ inch to 1 inch in diameter were dispersed in an outer coalescer tube (128b) of 4 inches in diameter. The coalescer tubes were disposed in a stilling chamber of 5 feet in height and 10 inches in diameter. A typical Navy ship's waste water concentration containing 500 ppm oil and 500 ppm dirt was fed into the system at a rate of ½-1 gallon per minute per four foot length of coalescer tube.

During actual tests, tube replacement capacity for the coalescer tube has been well beyond 300 gallons per tube which extrapolates to over 90,000 gallons for a 300 tube bundle. At $.50 per tube, this provides a tube replacement cost of $1.60 per 1000 gallons. The effectiveness of the dynamic surface oil coalescer may be illustrated by tests in which, during steady-state operation, an influent mixture of 154 mg/l oil and grease entering the coalescer tube produced an effluent exiting the stilling chamber of less than 1 mg/l of oil and grease.

At this point it should be apparent that the dynamic surface oil coalescer of the present invention provides a system which is simpler, less expensive, lighter in weight, and easier to operate and maintain than prior art oily waste water cleaning systems in several respects:

a. Surface filtration of particulate matter permits a simple, but effective, cleaning technique to restore the low pressure drop operation;

b. Use of a flexible filter tube permits ready release of the particulate matter's filter cake by a flexing action;

c. Use of a fabric coalescer tube provides a high strength permeable coalescing element;

d. The coalescing element does not produce coalescing via a foulant prone, dense, multi-layered construction but rather produces coalescing by holding an oil layer through which other water entrained oil droplets must pass;

e. Use of a thin fabric tube permits operation at low pressure drop which greatly reduces energy consumption;

f. Use of a stilling chamber permits buoyant forces on the coalesced oil droplets to overcome convection currents and allows oil to rapidly migrate upward to the oil-water interface, thus effecting separation;

g. Use of a thin fabric tube reduces coalescer weight, cost of coalescer element fabrication and capital cost for the coalescer assembly;

h. Use of a cleanable element reduces replacement cost as well as maintaining a low power requirement by reducing the time-averaged pressure drop across the element;

i. Simple piping configurations may be used allowing the exclusive use of plastic and fibrous non-corroding materials, thus eliminating corrosion as a consideration in maintenance;

j. Low equipment weight and physical size permit the design of highly portable, fully automated oily waste water treatment equipment.

Obviously many modifications and variations of the present invention are possible in the light of the above teachings. It is therefore to be understood that within the scope of the appended claims the invention may be practiced otherwise than as specifically described.

What is claimed is:

1. Apparatus for treating water-based liquid waste mixtures comprising:
    a stilling chamber for maintaining a volume of liquid within its boundaries in relatively still condition;
    a water-permeable, fabric, tubular element having an inlet end and an outlet end, the inlet end coupled to receive said mixture under pressure;
    means for introducing air into said liquid waste mixture prior to its input into said tubular element;
    means for selectively controlling the passage of fluid through the outlet end of said element;
    said means for controlling being capable of closing the outlet end of the element to prevent said mixture from flowing through said outlet end, the water in said mixture thereby being forced to pass through the fabric walls of said element, whereas solid particulates in said mixture are entrained on the inner surface of said fabric element;
    said means for controlling being capable of opening said outlet end of the element to allow said mixture to flow through said outlet end to dislodge said particulates entrained on the inner wall of said element from said inner wall and to flush said particulates out of said element through said outlet end.

2. Apparatus as recited in claim 1 wherein said stilling chamber is also adapted to permit removal of oil from the surface of water in said stilling chamber.

3. Apparatus as recited in claim 2 further including means for removing oil from the surface of water in said stilling chamber.

4. Apparatus as recited in claim 1 wherein said stilling chamber comprises:
    an enclosed cavity having an inlet means for receiving the liquid waste mixture, a first outlet means for removing separated water or water-based liquid, a second outlet means for removing separated oil, and a third outlet means, said tubular element coupled between said inlet means and said third outlet means.

5. Apparatus as recited in claim 4 wherein said tubular element includes tubular coalescer elements.

6. Apparatus as recited in claim 4 wherein said tubular element includes a plurality of tubular elements having their inlet ends coupled to said inlet means and their outlet end coupled to said third outlet means for providing a plurality of parallel coalescing paths for said liquid waste mixture.

7. Apparatus as recited in claim 5 or 6 wherein oil particles in said liquid waste mixtures impinging on the inner surface of said tubular coalescer elements will coalesce into a semi-continuous oil layer and as it is forced to pass through the fabric wall of said coalescer elements form an oil layer on the outside surface thereof which migrates due to its buoyance to the surface of the liquid in the stilling chamber.

8. Apparatus as recited in claim 6 wherein said plurality of tubular elements include a plurality of concentric coalescer elements arranged to provide a single coalescing path having a plurality of coalescing stages for said waste material.

9. Apparatus as recited in claim 4 further including:
    outlet piping means communicating with said tubular element via said third outlet means; and
    said means for selectively controlling including valve means disposed in said outlet piping means.

10. Apparatus as recited in claim 1 wherein each said tubular element comprises a single-layer of water-permeable oleophilic fabric.

11. Apparatus as recited in claim 10 wherein said fabric comprises cotton.

12. Apparatus as recited in claim 10 wherein said fabric comprises polypropylene.

13. Apparatus as recited in claim 1 wherein said tubular element is formed of a fabric woven from a natural fiber.

14. Apparatus as recited in claim 1 wherein said tubular element is formed of a fabric woven from a synthetic fiber.

15. Apparatus as recited in claim 1 further including means for maintaining the level of water in said stilling chamber at said predetermined level.

16. Apparatus as recited in claim 15 wherein said predetermined level is above the level where said tubular element is coupled to said inlet means.

17. A tubular element as recited in claim 1 further including electrically conducting means for dissipating of electrical charges impinging on said tubular element.

18. A tubular element as recited in claim 17 wherein said fabric is woven and wherein said electrically conducting means includes metallic threads interwoven in said fabric.

19. The tubular element as recited in claim 17 wherein said electrically conducting means includes a metallic mesh disposed as an outer layer on said fabric.

20. Apparatus as recited in claim 1 wherein said means for introducing air into said mixture includes a venturitypecoupling communicating with said mixture.

* * * * *